April 26, 1938.   C. B. VON GIRSEWALD ET AL   2,115,091
SULPHURIC ACID PROCESS
Filed Feb. 14, 1934   3 Sheets-Sheet 3

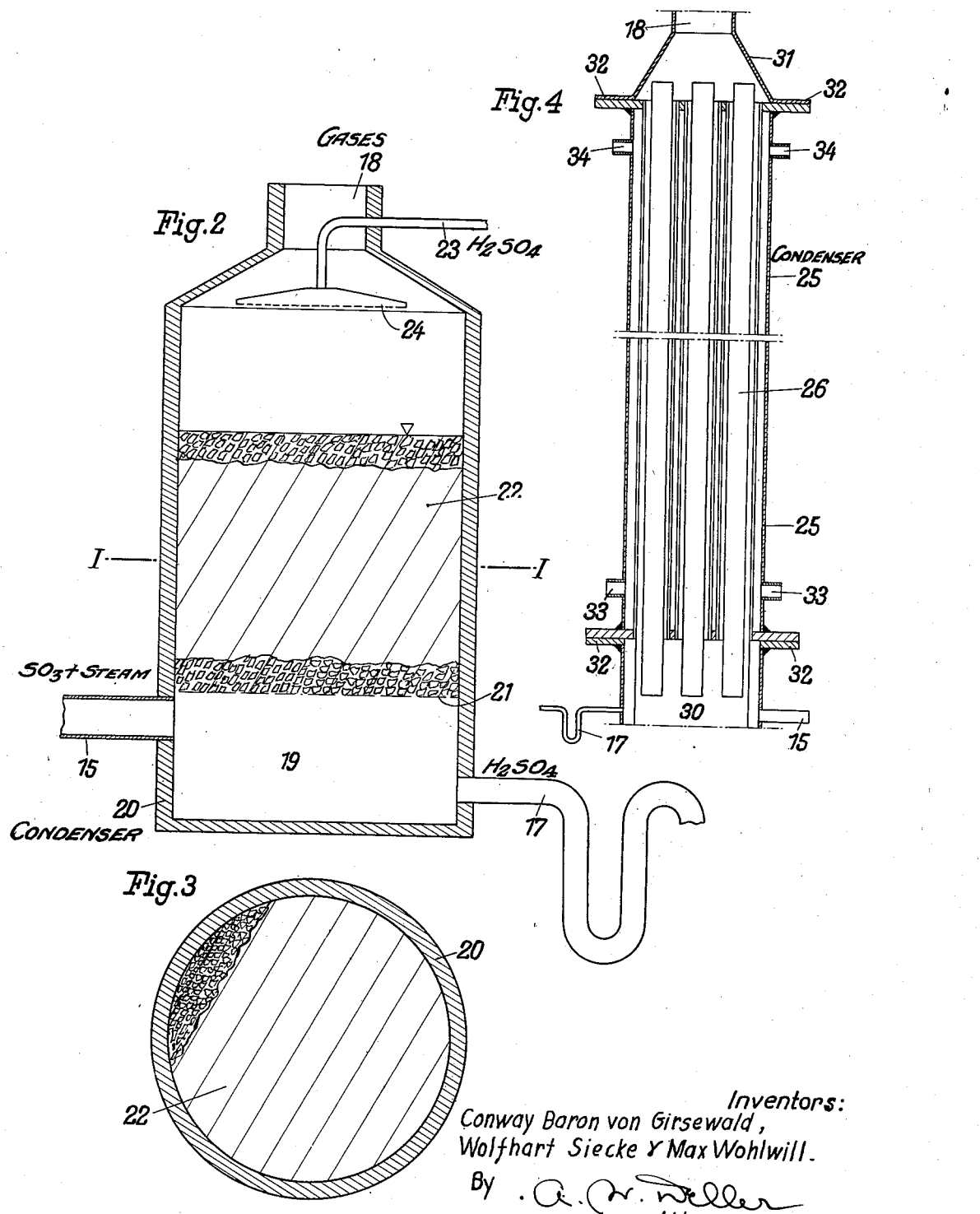

Inventors:
Conway Baron von Girsewald, Wolfhart Siecke & Max Wohlwill
By
Attorney

UNITED STATES PATENT OFFICE 2,115,091

SULPHURIC ACID PROCESS

Conway Baron von Girsewald, Wolfhart Siecke and Max Wohlwill, Frankfort-on-the-Main, Germany, assignors to American Lurgi Corporation, New York, N. Y., a corporation of New York Application February 14, 1934, Serial No. 711,198
In Germany February 15, 1933

13 Claims. (Cl. 23—175)

The present invention relates to a process of producing on an industrial scale concentrated sulphuric acid from impure, lean sulphur-bearing gas containing water with a non-platinic catalyst, and more particularly to industrial productions of concentrated sulphuric acid from impure sulphur-bearing industrial wastes containing water especially petroleum refinery wastes.

It is well known that attempts have been made to produce sulphuric acid from sulphur-bearing industrial wastes. For instance, in the petroleum industry waste refinery acid and acid sludge has been available in large amounts. Attempts have been made to produce concentrated sulphuric acid from these petroleum refinery wastes. It has been proposed to evaporate such wastes to produce a concentrated acid. Another attempt involved the incorporation of carbon with the waste sulphuric acid and heating the same. In this process sulphur dioxide, carbon dioxide and water were produced. A further proposal contemplated the reaction of waste sulphuric acid, carbon and oxides of nitrogen (for example, $NO_2$). The gases produced in this procedure were the same as those mentioned before but included nitrogen. It was also proposed to effect a regeneration of sulphuric acid by the hydrolysis of the waste, particularly the acid sludge, with water. This reaction was conducted usually in autoclaves at a temperature of about 130° C. to about 150° C. Unfortunately a weak acid, for example, 40% sulphuric acid, was produced by this method which then had to be concentrated by evaporation. The recovered acid was contaminated with impurities, especially carbon. When the concentration of sulphuric acid increased, a chemical reaction was observed between carbon and sulphuric acid. The general course of this reaction may be depicted by the following equation

$$2H_2SO_4 + C = 2SO_2 + 2H_2O + CO_2$$

Of course this reaction consumed a substantial portion of sulphuric acid and consequently the yield of concentrated sulphuric acid was greatly reduced. In other words, the efficiency of the recovery of sulphuric acid was poor. The foregoing proposals as well as others were objectionable because of one reason or another. It may be said that the chemical reactions and operations were of interest from a point of view of scientific curiosity but were of no interest from a commercial and industrial point of view. It may be generally said that the sulphur-bearing industrial wastes were usually thrown away and when the laws prevented such disposition, the wastes were burned and the waste gases containing sulphur dioxide were discharged into the atmosphere through a high chimney. As far as is known, no wholly satisfactory and successful process has been proposed for utilizing sulphur-bearing industrial wastes and for the production of concentrated sulphuric acid therefrom on a practical, commercial and industrial scale.

A process has been discovered which obviates the disadvantages and shortcomings of prior procedures and which provides the art with a satisfactory process of producing concentrated sulphuric acid from impure, lean sulphur-bearing gas containing water with a non-platinum catalyst on an industrial, commercial and practical scale.

It is an object of the present invention to provide a process which can be carried out at practically any place where sulphur-bearing industrial wastes are available to enable the conversion of such wastes, particularly petroleum refinery wastes, to concentrated sulphuric acid.

It is also within the contemplation of the invention to provide a process which is economical, which does not require expensive catalyst like platinum contact mass, and which can be conducted in low cost apparatus.

Other objects and advantages of the invention will become apparent from the following description, taken in conjunction with the accompanying drawings in which:

Fig. 2 illustrates a vertical sectional view of a preferred form of a condensing tower;

Fig. 3 is a cross-section taken on line I—I of Fig. 2;

Fig. 4 depicts a vertical sectional view somewhat schematic of another preferred form of a condensing tower;

Figure 1:
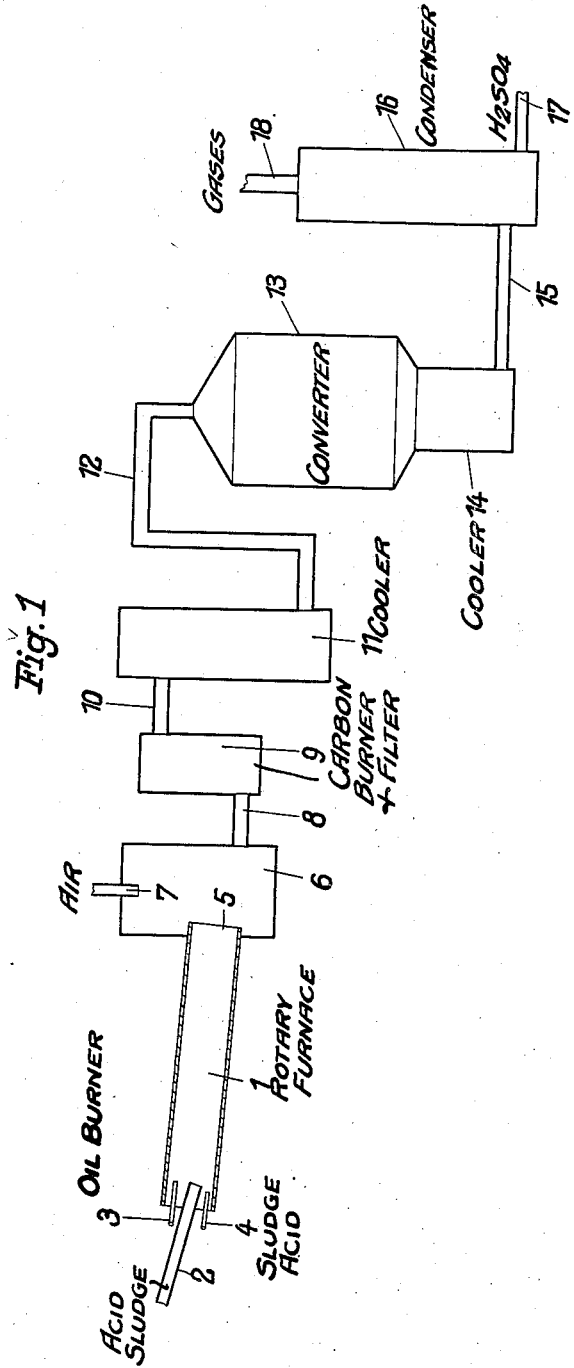
Fig. 1 shows diagrammatically a side elevational view of an apparatus capable of carrying the present process into practice.

According to the process of the present invention carbonaceous or hydrocarbonaceous wastes from the refining of petroleum with sulphuric acid are thermally decomposed, yielding a mixed gas or vapor containing, inter alia, sulphur dioxide and water vapor; this mixture, at a temperature of from about 350° to 450° C. (depending in part upon the sulphur dioxide content of the mixture), is directly passed, without any drying or other treatment, in the presence of air or other gas containing free oxygen, over a suitable oxidation catalyst insensible to water (e. g., a contact mass containing vanadium oxide, and an alkali oxide such as potassium oxide on precipitated silica), and thereupon is subjected to controlled cooling whereby sulphuric acid is condensed therefrom. Preferably, fractional condensation of the catalyzed mixture is practiced, the catalyzed mixture being slowly cooled to a temperature ranging from the dew point of the gases to 140° C., whereby sulphuric acid of high concentration (e. g., 96% more or less) is condensed in the presence of water vapor.

For this purpose, the sulphuric acid wastes, e. g., the acidic resins, are heated, whereby, beginning at 150° C., the reduction of the sulphuric acid according to the formula quoted above is initiated. Hence by this combustion, in which temperatures up to 1000° C. are reached, there is obtained directly a mixture of sulphur dioxide, water vapor and carbon dioxide. The kind of combustion in this case is only of secondary importance. It may be brought about in rotating tube furnaces under utilization of the combustion heat for the purpose of obtaining steam, or in any other manner. In the rotating tube furnace itself, an acidic waste with a carbon content of, for example, 23%, may be burned and split up without the use of other combustible. With lower contents of carbon the addition of small quantities of fuel and the introduction of air must be considered. For the reduction of the sulphuric acid present, however, the presence of only 11% of carbon with relation to the amount of acid recomputed to mono-hydrate suffices.

While the presence of great quantities of water vapor and other combustion products makes the normal contact process exceedingly difficult, the process according to the present invention offers a simple and economical method of recovering sulphuric acid from the mentioned waste products. In this method it is of no importance how much moisture is present in the combustion gases, since by the fractional condensation an acid of any required percentage strength up to about 96% can be recovered. It is therefore possible that in the waste acid itself moisture and residues of oil having a certain hydrogen content may be present without hindering the carrying out of the process. For condensation purposes it is even advantageous that an excess of water vapor beyond the amount necessary for the formation of mono-hydrate be present in the mixture.

For carrying out the process it is important only to regulate the entrance temperature of the combustion gases into the contact chamber and to control the subsequent cooling of the catalyzed mixture. In case of too high entrance temperatures we may interpose between the decomposition zone and the catalyzing zone a means for cooling, which, as mentioned before, may be utilized for the production of steam. The suitable entrance temperature for the contact apparatus is about 350° to 450° C. depending upon the $SO_2$ content.

According to the present one, the catalyzed mixture must be uniformly slowly cooled within the temperature range from the dew point of the mixture to about 140° C. as the lower limit. The rate of cooling is, therefore, prolonged from the point of view of the condensation under uniform cooling conditions when the dew point is raised, which latter may be effected by working under superatmospheric pressure, as, for example, in the presence of a considerable excess of steam.

It has been stated that a fractional condensation of the resulting acid can be carried out in the presence of an excess of water vapor. This possibility is of special importance for the recovery of the sulphuric acid in acidic resins, or the waste sulphuric acid of petroleum refineries, because the acid required for refining petroleum must have a concentration of about 96%. The combination of fractional condensation in the recovery of sulphuric acid from the mentioned waste products therefore has special advantages.

Furthermore, the amount of heat liberated by the condensation can be utilized for the production of steam. It has been found that the conditions required for a good condensation may even then be fulfilled when cooling of the condensation columns is carried out indirectly by means of water. When doing this, however, it is important that the walls of the columns be sufficiently poor heat conductors to avoid a too abrupt chilling effect of the cooling water upon the gases. It will therefore be more to the purpose to make the walls of ceramic material preferably in such a way as to fit the iron tubes on their inside with clay or china tubes and to fill the interstices with readily melting metals, sand or with acid-proof putty. The water used as a cooling liquid is kept at boiling temperature in its tube, if desired under pressure, whereby the difference of temperatures between the gases to be condensed and the temperature of the surroundings is decreased still further.

An economically important feature of the process resides in the fact that thereby it is possible to produce about 1.5 tons of steam with 3 atm. pressure in the condensation of one ton of sulphuric acid from a gas containing 4% $SO_2$.

Illustrative of this process is the recovery of sulphuric acid in concentrated form from a waste acid, (from refining petroleum) containing 37% $H_2SO_4$ and 3.4% C. While this acid cannot be recovered by hydrolysis, because all organic substances remain in solution, and while with concentration an almost complete reduction of the sulphuric acid to $SO_2$ would take place, especially if the concentration must be carried to above 90% of $H_2SO_4$, the process of the present invention makes possible a rapid and simple recovery of the acid contained therein as $H_2SO_4$ of up to about 96% strength. This waste acid is thermally decomposed and the resulting gas mixture, containing $SO_2$, water vapor in excess of the amount required to form sulphuric acid from the $SO_3$ producible from the $SO_2$, and $CO_2$, admixed with the necessary air, is directly passed at a temperature of 400° C. over a contact mass consisting of vanadium oxide, precipitated silica and potassium oxide. The so-catalyzed gas mixture thereupon is conducted through a heat exchanger wherein it is gradually cooled to a temperature of 300° or 280° C., and thereupon is conducted upwardly through a jacketed condensing column containing inert filler material and therein is slowly cooled to a temperature of about 150° C., the catalyzed mixture being passed through the condensing column at a rate of flow amounting to about 5 meters per second, the cross-section of the column being so proportioned to its length that at said rate of flow the catalyzed gas mixture requires a period of somewhat more than 0.15 second generally from about 0.2 to about 0.6 second for passage therethrough. At the same time, water at boiling temperature is circulated through the jacket of the column, whereby to provide the necessary cooling. There is condensed, thereby, a sulphuric acid containing more than 90% $H_2SO_4$, the effluent gases containing steam. This condensate in its downward passage over the filling material serves to effect cooling of the upwardly moving gas mixture.

It will be apparent that the process of the present invention may be effected when using another oxidation catalyst than the one specifically mentioned. Thus, there may be employed an oxidation catalyst containing an oxide of an element of the iron group or of manganese; or, the catalyst may contain vanadium oxide in association with titanic acid, germanium dioxide, stannic acid, phosphoric acid, tungstic acid or molybdenic acid.

In the process according to the invention, special attention should be given to the condensation of sulphuric acid.

It has already been stated that no inconsiderable quantities of heat are liberated both when $SO_3$ and $H_2O$ are brought together and also when vaporous $H_2SO_4$ is condensed to the liquid acid. Moreover the sensible heat of the moist gases must be led off. These quantities of heat must be dissipated during condensation, which is a matter of considerable difficulty when it is required to produce very large quantities of sulphuric acid. It is an obvious suggestion to conduct away the heat in a similar manner to that carried out in other condensing processes by means of direct and indirect cooling with water in metallic tubes or tubes without fillers. This process failed completely, however, when applied to the condensing of sulphuric acid, since cooling carried out, for example, by spraying water during the critical temperature range produced a chilling effect. As a consequence thereof a mist of sulphuric acid is formed which could not hitherto be reconverted by any practical utilizable means into a liquid form capable of forming drops. It was therefore a question of conducting off the heat liberated with adequate care. Ceramic columns provided with fillers were just suited for this purpose because the fillers effected a thorough inter-mingling of the gases and prevented a too rapid rate of cooling at the walls of the towers.

It has, moreover, transpired that with higher velocities of flow the quantity of condensate produced per unit of cross-sectional area becomes greater. It is, therefore, advantageous to work with velocities of flow amounting to from about 0.8 to 5 metres per second.

Cooling in condensing columns of this type is advantageously effected by heat exchange through the walls with the surrounding atmosphere. Nevertheless in order not to have to construct condensing columns of excessive height, the condensation chambers are preferably constructed in the shape of long channels, which lie in a helical form around a cylinder. In this manner an annular tower is produced which is bathed internally and externally by atmospheric air, and which, even with a low height, offers a long condensation path and adequately slow fall of temperature.

It is to be observed that in carrying out the present process, even in the presence of a considerable excess of steam, that is to say, a quantity of steam exceeding that necessary for forming $H_2SO_4$ from $SO_3$, it is possible to produce high percentage sulphuric acid by observing the conditions hereinbefore set forth.

If no excess of steam be added, then the gases in the column may also be allowed to cool down further even in cocurrent flow with the condensate without any more attention being then paid to the rate of cooling. If, on the other hand, an excess of steam be present, then on further cooling the gases in the column, the concentration of the acid produced can be controlled by the temperature of the issuing gases. An important novel recognition also lies in this fact, since hitherto it was only considered possible to regulate the concentration by controlling the quantities of steam present. It has been shown that when, for example, cooling the gases down to about 100° C. a 93% acid can still be obtained even when the excess of steam present would appear to indicate a substantially higher degree of dilution. It is, however, always important that in the presence of an excess of water vapor the rate of cooling within the stated range of temperature shall not be kept too small.

It has proved to be of particular advantage to carry out the process in the condensing column in counterflow, that is to say, to introduce the gases at the bottom of the column and to allow them to issue at the top whilst the condensate formed drops down from the top to the bottom. The condensed sulphuric acid is drawn off at a temperature of about 280° C. with this method of working, concentrations of 96% and over being produced without difficulty by this means. Even working with cocurrent flow—during which the sulphuric acid is drawn off at a temperature according to what has already been said—still gives good results, but in general does not allow such high acid concentrations to be obtained as when working in counter-current flow. When working in counter-current flow the concentration of the acid naturally depends upon the temperature at which the gases enter the bottom of the condensing tower, with the result that in no circumstances does an excess of water produce dilution of the acid flowing out at the bottom provided too rapid cooling at the walls of the coolers is avoided.

From the conditions set forth in the foregoing it is apparent that the sulphuric acid must be uniformly slowly cooled within the temperature range from the dew-point down to about 140° C. The rate of cooling is therefore prolonged from the point of view of the condensation, under uniform cooling conditions when the dew-point is raised. This can be effected by the presence of a considerable excess of steam. The invention therefore consists in improving the condensation by working in the presence of a considerable excess of steam, in support of which the following may be stated.

At temperatures above its boiling point of 330° C. monohydrate ($H_2SO_4$) undergoes, as is known, extensive decomposition into $H_2O$ and $SO_3$ molecules. Assuming a concentration of about 5% by volume of $SO_3$ at 330° C. this dissociation of the sulphuric acid amounts to about 69% if the proportion of $SO_3:H_2O$ is as 1:1. The equilibrium of the reversible reaction $$H_2SO_4 \rightleftarrows SO_3 + H_2O$$

depends, however, upon alteration in the $H_2O$ component, so that as the $H_2O$ proportion increases the sulphuric acid proportion increases.

The equilibrium is then displaced to the left of the equation. On doubling the content of $H_2O$ still assuming the presence of a 5% gas at 330° C. only 50% of the sulphuric acid vapor is dissociated. On increasing the proportion of $H_2O$ to a treble excess only 39% of the sulphuric acid vapor is dissociated. By increasing the water content the incipient condensation of the sulphuric acid is displaced to a temperature range lying about 50 to 70° C. higher than that under normal conditions. At the instant when condensation of gaseous $H_2SO_4$ to liquid sulphuric acid commences, the proportions of the above equation are still further altered automatically with an excess of water in favor of the $H_2O$ vapor and thus in favor of the formation of sulphuric acid vapor. If, for example, one starts with a gas in which the proportion of $H_2O$ to $SO_3$ is as 2:1, and if 50% of the sulphuric acid be condensed to liquid, the proportion for the residual quantity of $SO_3$ in the gas is no longer 2:1, but is 3:1. This proportion is raised to a higher value as the condensation of the liquid sulphuric acid progresses.

The presence of an excess of steam does not exert a harmful influence upon the concentration of sulphuric acid formed, because the end of the condensation is apparently independent of the water content at temperatures of 140 to 150° C. At this temperature the vapor pressure of the sulphuric acid at the acid concentration occurring is so small that the loss in the waste gas is practically nil. It is therefore merely necessary to conduct away the waste gases from the condensation towers at this temperature in order to obtain a high acid concentration in the outflowing sulphuric acid.

The excess of water vapor is without harmful effect when working in counter-current, especially during fractional condensation, because in this case the concentration is determined by the temperature of the gases at the inlet end of the tower.

In order to produce an effective improvement in the condensation the proportion of water vapor to $SO_3$ should exceed 1.6:1 and may even be considerably greater than 2:1. By means of this excess of water the equilibrium in the vapor phase according to the reversible reaction:

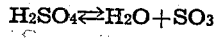

$$H_2SO_4 \rightleftharpoons H_2O + SO_3$$

is displaced to the left and the proportion of $H_2SO_4$ is increased to such an extent that the dew point of the acid vapors is raised to a higher temperature than when only a little excess of water is used. Thus, by using a higher concentration of water vapor to $SO_3$, such as 1.6 to 1 or 2 to 1, the dew point of the $H_2SO_4$ vapor is raised, thereby reducing the danger of the formation of acid mist as hereinabove more fully explained, and a more effective condensation of acid is obtained.

Raising the dew point may also be produced by working under increased pressure. It is true that it is known per se during catalysis of $SO_2$ to $SO_3$ to displace the equilibrium in favor of the $SO_3$ by increasing the pressure. In the presence of large quantities of steam increasing the pressure produces an improvement in the condensation conditions because the equilibrium in the reversible reaction

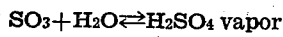

$$SO_3 + H_2O \rightleftharpoons H_2SO_4 \text{ vapor}$$

is displaced in favor of the formation of $H_2SO_4$ vapor, by which means the partial pressure of the vaporous sulphuric acid is increased. The pressures to be employed can be maintained within the known limits, that is to say from about 1 to 10 atmospheres. From a practical point of view the present invention yields a whole series of the most diverse spheres of application. Thus, for example, industrial gases containing small or variable quantities of $SO_2$ which were hitherto allowed to escape into the atmosphere unused may now be utilized. The following examples illustrate more fully the invention:—

*Example 1*

200 kgs. of acid sludge containing 61.88% carbon, 21.68% $H_2SO_4$ and about 5% of water were charged hourly into a rotary tube furnace, the mass being ignited while in continuous motion. At the same time there was sprayed in hourly about 600 kgs. of waste acid containing 77.11% $H_2SO_4$, 12.9% carbon, and about 7% of water, decomposition taking place under the influence of the heat of combustion and the excess of air present. The gases issuing from the rotary tube had a temperature of about 1000° C. and contained 5% of $SO_2$ and 2% of oxygen. To these gases a further quantity of air was admixed, in order to raise the oxygen content thereof to about 8%. The gases then contained about 3.3% $SO_2$ and had a temperature of about 650° C., the water content amounting to about one-and-one-half to double the quantity of $SO_2$ present. The gases entered a contact apparatus at a temperature of about 350° C. wherein the $SO_2$ was oxidized to $SO_3$. The contact mass consisted of vanadium oxide (6%), potassium oxide (3%) and 91% silica, a mixture which is known to be insensitive to moisture. After leaving the contact apparatus, the gases were first further cooled to about 330° C. (temperature of incipient condensation) and at this temperature they were passed into a tower charged with fillers, flowing from the bottom upward therein. In this tower the gases were irrigated with about four times the quantity of concentrated sulphuric acid of more than 90% concentration, for the purpose of further cooling them in a controlled manner down to about 140° C. (end of the condensation).

The sulphuric acid condensing at the bottom of the tower was drawn off together with the irrigating acid, and had a concentration of at least 94% $H_2SO_4$. The yield amounted in such case to about 95% of the sulphur contained in the waste products.

Any soot or other unburnt dust particles carried over in the gases after leaving the rotary tube were burnt without difficulty on the contact mass under the selected working conditions. Should however, the material to be burnt still contain inorganic ashy constituents, a filter of ceramic material must be inserted between the contact apparatus and the rotary tube, in which the carbon is burnt and the inorganic constituents are retained.

*Example 2*

High-grade sulphuric acid could be recovered even from acid sludge alone containing about 61.88% carbon, 21.68% $H_2SO_4$ and about 5% of water. The resin was again ignited in the rotary tube furnace and yielded a gas containing about 0.3% $SO_2$, 12% of oxygen and 3% of water. This gas was first passed under a steam boiler and thus utilized for steam raising, being thereupon led through a contact apparatus wherein the $SO_2$ was oxidized catalytically without difficulty to $SO_3$. In spite of the large excess of water, it was possible to condense the catalyzed $SO_3$ in the subsequent condensing plant in the form of about 90% sulphuric acid. This sulphuric acid is free from carbon and can be further concentrated if required, without loss.

*Example 3*

In a few cases it is necessary to subject the waste acids alone to treatment. Such a waste acid contains for example, 77.12% $H_2SO_4$, 12.9% carbon and about 7% of water. In order to decompose the sulphuric acid into $SO_2$, about 5% of oxygen is needed, nevertheless the additional carbon present is not sufficient to produce the necessary temperatures in this case. It is therefore necessary to provide a further source of heat and to this end oil-firing means is disposed in front of the rotary tube furnace, the waste acids being sprayed into the oil-heated rotary furnace. Under these conditions gases were produced containing about 4% $SO_2$ and 6.8% of oxygen, the temperature in the furnace being maintained at about 900° C. The issuing gas was passed through a mechanical filter, in which small residual amounts of inorganic ashy constituents were retained, whilst the organic constituents in the gas were burnt. The temperature of the gases was reduced to about 450° C. partly in the filter and partly after leaving same and at this temperature the gases were passed into the contact apparatus. The $SO_2$ was catalytically oxidized to $SO_3$ therein, the sulphuric acid being subsequently condensed in the manner set forth in Example 1. A sulphuric acid was thus obtained containing at least 94% $H_2SO_4$, which can be employed without further treatment for petroleum refining. The yield of sulphuric acid amounts to about 95% of the original sulphur.

The present invention, hereinabove more fully described, may be carried out into practice successfully and economically in the apparatus illustrated in the accompanying drawings. Referring more particularly to Fig. 1, reference numeral 1 denotes a rotary tubular furnace comprising an inlet 2 for acidic resins, an oil burner 3 and a feed pipe 4 for introducing therein waste acid. In rotary furnace 1, these wastes from the refining of petroleum are thermally decomposed as herein more fully described and yield a mixed gas or vapor containing inter alia, sulphur dioxide and water vapor. Outlet 5 of furnace 1 discharges the mixed gases which may have a temperature of about 1000° C. into mixing chamber 6 wherein a predetermined amount of air is being introduced through intake pipe 7 whereby the oxygen content of the gas is adjusted to an amount sufficient for converting the $SO_2$ thereof to $SO_3$. The thus treated gases are led through conduit 8 to filter 9 of conventional construction in which the inorganic ashes and dust carried away with the gases are retained and the carbon or other solid organic particles are burned out. The filtered gases may have a temperature of about 650° C. but since the preferred temperature for converting the $SO_2$ is about 450° to 350° C. depending on the $SO_2$ content of the gases, as hereinabove more fully described, the filtered gases are first led through pipe 10 to cooler 11 of suitable construction wherein they are cooled to the desired temperature and thence through conduit 12 to contact chamber 13 in which the $SO_2$ gases are converted to $SO_3$. As hereinabove more fully described, contact chamber 13 is of conventional structure and is charged with an oxidation catalyst insensible to moisture. The catalyzed gases are first cooled in chamber 14 to about the temperature of incipient condensation of sulphuric acid, approximately 330° C. and are then led through pipe 15 to the bottom of condensing tower 16 where they are subjected to controlled cooling from about 330° C. at the inlet thereof to about 140° C. at gas outlet 18, whereby the sulphuric acid is condensed without the formation of any acid mist and is withdrawn through acid outlet 17 in concentrations up to 96%, and the residual gases are withdrawn through gas outlet 18. The preferred proportion of steam to $SO_3$ and other preferred conditions and precautions to be observed in carrying out the process have been described more in detail hereinabove.

Figs. 2 and 3 and Figs. 4, 5 and 6 respectively illustrate two embodiments of a condensing apparatus capable of condensing sulphuric acid from the hereinabove described mixed gases or vapors according to the principle of the present invention. The condensing apparatus shown in Figs. 2 and 3 comprises a vertical cylindrical shell 20 enclosing a collecting chamber 19 at the lower end thereof which has an inlet 15 for the gases containing the $H_2SO_4$ vapors to be condensed and a syphon 17 for withdrawing condenser $H_2SO_4$. Above collecting chamber 19 is horizontal circular grate 21 fixed to the inner side of shell 20 and extending the entire diameter of the shell to support a column of filling material 22 which is closely packed within said shell from grate 21 to any desired height. The filling material 22 is preferably composed of small, cylindrical hollow bodies or of similar known materials, such for instance as are used for filling the Glover towers in the manufacture of sulphuric acid. The upper end of the condensing tower is provided with outlet 18 for the uncondensed gases, and with inlet 40 pipe 23 for a cooling medium, which is downwardly bent and is provided at the end with horizontal sprinkling head 24 for more evenly sprinkling the cooling medium over the entire width of the tower. In carrying the invention into practice, the mixed gases or vapors containing $SO_3$ gas, steam etc., treated in the manner described, are introduced into the cooling tower through inlet 15 at a temperature of about 330° C. while a suitable amount of sulphuric acid is sprinkled through inlet pipe 23 and distributor head 24 as a direct cooling medium for the gases. It is to be observed that the upward flow of the mixed gases is retarded by the column of filling material 22 through which it permeates upwardly and is mixed with the cooler liquid sulphuric acid flowing in the opposite direction. The mixed gases are accordingly cooled at a proper rate to about 140° C. whereby sulphuric acid is condensed out of the gases without the formation of acid mists, drips back to collecting chamber 19 together with the cooling sulphuric acid and is withdrawn through syphon 17 to suitable cooling and collecting means, not shown in the drawings. Of course, part of the condensed sulphuric acid may be reintroduced into the condensing tower through sprinkler 24, after being cooled to a suitable temperature, and used as a cooling medium for condensing further amount of sulphuric acid. The uncondensed gases containing the excess steam are withdrawn at a temperature of about 140° C. through gas outlet 18.

Figure 5:
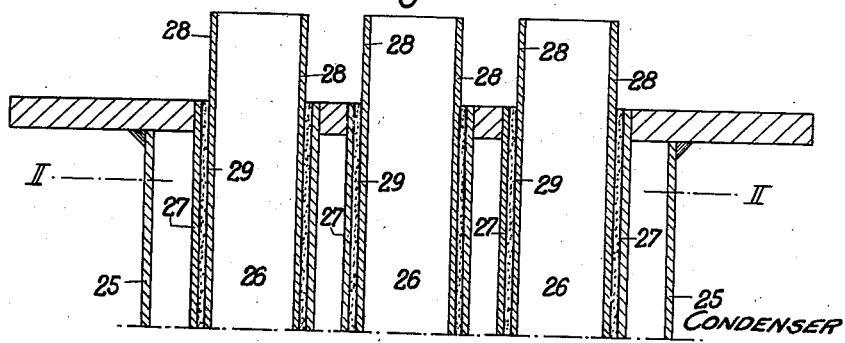
Fig. 5 shows on a larger scale and more in detail a portion of the apparatus shown in Fig. 4.
Figure 6:
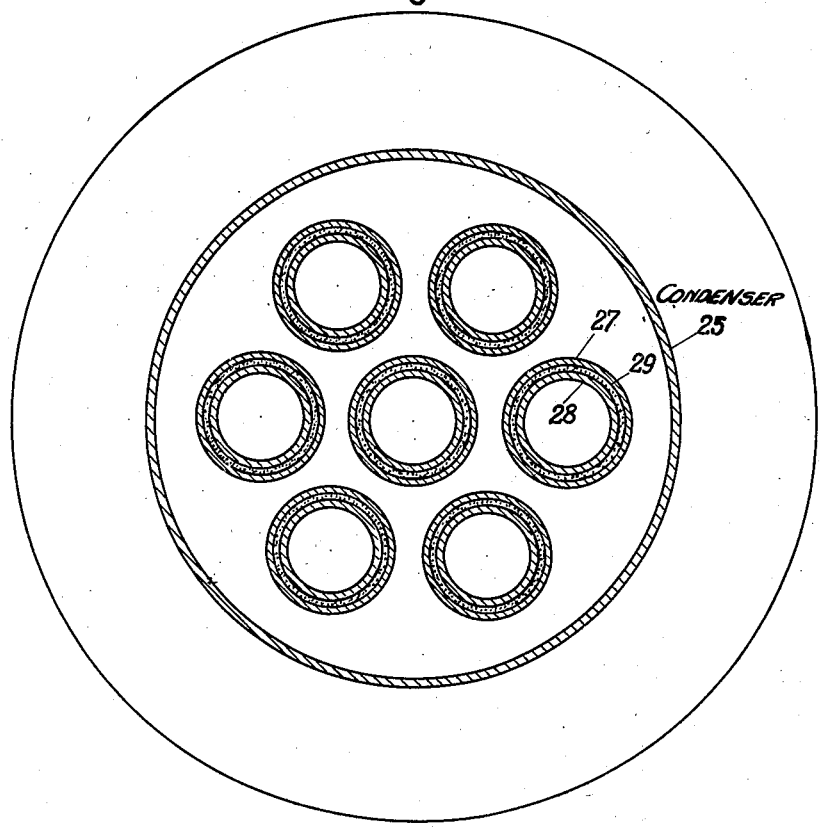
Fig. 6 illustrates an enlarged sectional plan view taken on line II—II of Fig. 5.

In the apparatus shown in Figs. 4, 5 and 6, the mixed gases are cooled according to the principle of the present invention by indirect cooling.

With reference to Fig. 4 apparatus comprises an external vertically elongated cylindrical jacket 25 of suitable material, preferably sheet iron, having liquid inlets and outlets 33 and 34 at both ends thereof. Jacket 25 encloses a plurality of tubes 26 vertically disposed therein and is supported by condensate collecting chamber 30 from which it is separated by a suitable head, while at the upper end thereof the jacket is provided with gas outlet chamber 31 from which it is also separated by a suitable head. It is to be observed that the vertical tubes project through both upper and lower head and provide a plurality of connections between condensate collecting chamber 30 and gas outlet chamber 31 which are separated from jacket 25. In carrying out the invention, the gases containing the sulphuric acid to be condensed are introduced into chamber 30 through gas inlet 15 at a temperature of about 330° C., while a proper amount of a suitable cooling medium, such as hot oil, is circulated within jacket 25 and around pipes 26. In flowing upwardly within pipes 26, the gases are cooled in the manner hereinabove described to prevent formation of acid mist, to condense sulphuric acid of high concentration up to about 96% which drips back to chamber 30 and is withdrawn through syphon 17 while uncondensed gases containing excess steam are withdrawn through outlet 18 of chamber 31. The proper rate of cooling of the mixed gases to prevent formation of acid mist is obtained by properly controlling the rate of flow of the gases through tubes 26 and by properly controlling the rate of flow and the temperature of the cooling medium in jacket 25.

As better seen in Figs. 5 and 6, cooling tubes 26 are preferably made of two concentric pipes 27 and 28 which are separated by a layer 29 of loose dry material such as sand. Inner tube 28 which comes in contact with hot sulphuric acid is made of acid resisting material such as porcelain, ferrosilicon or quartz, while outer pipe 27, which comes only in contact with the cooling medium and is not subjected to the strong corrosive action of hot sulphuric acid, is made of stronger metallic material. The layer 29 of dry loose sand interposed between tube 27 and tube 28 permits free expansion of the tubes which have different coefficients of expansion and prevents breakage thereof.

We claim:

1. The process of producing on an industrial scale concentrated sulphuric acid from impure lean sulphur-bearing gas containing water with a water-insensitive catalyst which comprises burning sulphur-bearing, combustible organic, industrial wastes to produce a gas containing sulphur dioxide, water vapor in amounts at least sufficient for the formation of sulphuric acid and sufficient oxygen to oxidize the $SO_2$ to $SO_3$, removing dust from said gas, adjusting the gas to a temperature of about 350° C. to about 450° C., passing said gas in contact with a water-insensitive catalyst to cause the conversion of sulphur dioxide to sulphur trioxide and condensing sulphuric acid from the catalyzed gas with the water present therein as vapor by subjecting the gas to restricted cooling in the presence of an excess of steam through a temperature range between the dew point of the mixture and 140° C.

2. The process of producing on an industrial scale concentrated sulphuric acid from impure lean sulphur-bearing gas containing water with a water-insensitive catalyst which comprises burning sulphur-bearing, combustible organic, industrial wastes to produce a gas containing sulphur dioxide and water vapor, said water vapor being in excess of that required for the formation of sulphuric acid, removing dust from said gas, admixing oxygen with said gas to provide sufficient oxygen for the oxidation of sulphur dioxide to sulphur trioxide, adjusting the gas to a temperature of about 350° C. to about 450° C., passing said heated gas in contact with a water-insensitive catalyst to cause the conversion of sulphur dioxide to sulphur trioxide and condensing sulphuric acid from the catalyzed gas with the water present therein as vapor by subjecting the gas at velocities of flow from about 0.8 to about 5.0 metres per second to restricted cooling through a temperature range between the dew point of the mixture and 140° C.

3. The process of producing on an industrial scale concentrated sulphuric acid from impure lean sulphur-bearing gas containing water with a water-insensitive catalyst which comprises burning sulphur-bearing, combustible organic, industrial wastes to produce a gas containing sulphur dioxide and water vapor, said water vapor being in excess of that required for the formation of sulphuric acid, removing dust from said gas, admixing oxygen with said gas to provide sufficient oxygen for the oxidation of sulphur dioxide to sulphur trioxide, adjusting the gas to a temperature of about 350° C. to about 450° C., passing said gas in contact with a water-insensitive catalyst to cause the conversion of sulphur dioxide to sulphur trioxide and condensing in a tower sulphuric acid from the catalyzed gas with the water present therein as vapor by subjecting the gas to restricted cooling through a temperature range between the dew point of the mixture and 140° C., and controlling the rate of flow of the gas through said tower from about 0.8 to 5 metres per second.

4. The process of producing on an industrial scale concentrated sulphuric acid from impure lean sulphur-bearing gas containing water with a water-insensitive catalyst which comprises burning sulphur-bearing, combustible organic, industrial wastes to produce a gas containing sulphur dioxide and water vapor, said water vapor being in excess of that required for the formation of sulphuric acid, removing dust from said gas, admixing oxygen with said gas to provide sufficient oxygen for the oxidation of sulphur dioxide to sulphur trioxide, adjusting the gas to a temperature of about 350° C. to about 450° C., passing said gas in contact with a water-insensitive catalyst to cause the conversion of sulphur dioxide to sulphur trioxide and condensing in a tower sulphuric acid from the catalyzed gas with the water present therein as vapor by subjecting the gas to restricted cooling through a temperature range between the dew point of the mixture and 140° C., and controlling the time of cooling to about 0.2–0.6 second.

5. The process of producing on an industrial scale concentrated sulphuric acid from impure lean sulphur-bearing gas containing water with a water-insensitive catalyst which comprises burning sulphur-bearing, combustible organic, industrial wastes to produce a gas containing sulphur dioxide and water vapor, said water vapor being at least sufficient for the formation of concentrated sulphuric acid, removing dust from said gas, passing said gases containing sulphur dioxide into a contact furnace in contact with a water-insensitive catalyst in association with gases containing oxygen and with at least sufficient water vapor for the formation of concentrated sulphuric acid, and thereupon condensing sulphur trioxide and the equivalent amount of water vapor issuing from the contact furnace in the form of sulphuric acid within a temperature range the upper limit of which is given by the dew point of the gases and lower limit at least 140° C. and controlling the time of cooling to about 0.2 to about 0.6 second.

6. The process of producing on an industrial scale concentrated sulphuric acid from impure lean sulphur-bearing gas containing water with a water-insensitive catalyst which comprises burning sulphur-bearing, combustible organic, industrial wastes to produce a gas containing sulphur dioxide and water vapor, said water vapor being at least sufficient for the formation of concentrated sulphuric acid, removing dust from said gas, passing said gases containing sulphur dioxide into a contact furnace in contact with a water-insensitive catalyst in association with gases containing oxygen and with at least sufficient water vapor for the formation of concentrated sulphuric acid, and thereupon cooling the gases issuing from the contact furnace to form sulphuric acid within a temperature range the upper limit of which is given by the dew point of the gases and the lower limit by about 140° C., and at a uniform rate throughout, the time taken for cooling through the said temperature range not being allowed to fall below 0.2 second.

7. The process of producing on an industrial scale concentrated sulphuric acid from impure lean sulphur-bearing gas containing water with a water-insensitive catalyst which comprises burning sulphur-bearing, combustible organic, industrial wastes to produce a gas containing sulphur dioxide and water vapor, said water vapor being in excess of that required for the formation of concentrated sulphuric acid, removing dust from said gas, passing said gases containing sulphur dioxide into a contact furnace in contact with a water-insensitive catalyst in association with gases containing oxygen and with a quantity of water vapor in excess of that required for the formation of concentrated sulphuric acid, and thereupon cooling the gases issuing from the contact furnace to form sulphuric acid within a temperature range the upper limit of which is given by the dew point of the gases and the lower limit by about 140° C., and at a uniform rate throughout, the time taken for cooling through the said temperature range not being allowed to fall below 0.2 second.

8. The process of producing on an industrial scale concentrated sulphuric acid from impure lean sulphur-bearing gas containing water with a water-insensitive catalyst which comprises burning sulphur-bearing, combustible organic, industrial wastes to produce a gas containing sulphur dioxide and water vapor, said water vapor being at least 60% in excess of that required for the formation of concentrated sulphuric acid, removing dust from said gas, passing said gases containing sulphur dioxide into a contact furnace in contact with a water-insensitive catalyst in association with gases containing oxygen and with a quantity of water vapor at least 60% in excess of that required for the formation of concentrated sulphuric acid, and thereupon cooling the gases issuing from the contact furnace to form sulphuric acid within a temperature range the upper limit of which is given by the dew point of the gases and the lower limit by about 140° C., and at a uniform rate throughout, the time taken for cooling through the said temperature range not being allowed to fall below 0.2 second.

9. The process of producing on an industrial scale concentrated sulphuric acid from impure lean sulphur-bearing gas containing water with a water-insensitive catalyst which comprises burning sulphur-bearing, combustible organic, industrial wastes to produce a gas containing sulphur dioxide and water vapor, said water vapor being in substantial excess of that required for the formation of sulphuric acid, removing dust from said gas, passing said gases containing sulphur dioxide into a contact furnace in contact with a water-insensitive catalyst in association with gases containing oxygen, and thereupon fractionally condensing concentrated sulphuric acid from the water vapor of the gases issuing from the contact furnace within a temperature range the upper limit of which is given by the dew point of the gases and the lower limit by about 140° C., so that all the sulphuric acid present in the gases is deposited in the form of concentrated sulphuric acid containing more than 90% $H_2SO_4$.

10. The process of producing on an industrial scale concentrated sulphuric acid from impure lean sulphur-bearing gas containing water with a water-insensitive catalyst which comprises establishing a supply of petroleum refinery wastes containing sulphuric acid, thermally decomposing said petroleum refinery wastes, admixing the resulting gaseous products with air, passing the gas mixture containing $SO_2$ and water vapor in substantial excess of that necessary for formation of sulphuric acid over a water-insensitive oxidation catalyst at reaction temperature and thereupon subjecting the catalyzed mixture to controlled slow cooling substantially throughout the cross-section of said mixture through a range between the dew point of the mixture and 140° C.

11. The process of producing on an industrial scale concentrated sulphuric acid from impure lean sulphur-bearing gas containing water with a water-insensitive catalyst which comprises establishing a supply of petroleum refinery wastes containing sulphuric acid, burning said petroleum refinery waste, passing the combustion gases containing $SO_2$, and water vapor in substantial excess of that necessary to form sulphuric acid admixed with a gas containing free oxygen over a water-insensitive oxidation catalyst at reaction temperature and thereupon subjecting the catalyzed mixture to controlled gradual and slow cooling without too rapid cooling at the walls of the coolers through a range between the dew point of the mixture and at least 140° C.

12. The process of producing on an industrial scale concentrated sulphuric acid from impure lean sulphur-bearing gases containing water with a water-insensitive catalyst which comprises introducing sulphur dioxide bearing gases containing water vapor in excess of the amount necessary to form sulphuric acid into a contact furnace together with oxygen in the presence of a water-insensitive catalyst at a temperature of about 350° C. to about 450° C. to cause the conversion of sulphur dioxide to sulphur trioxide and condensing said gases to form sulphuric acid by subjecting said gases to restricted cooling in the presence of an excess of water vapor between the dew point of the gas mixture and a temperature below 140° C.

13. The process of producing on an industrial scale concentrated sulphuric acid from impure lean sulphur-bearing gases containing water with a water-insensitive catalyst which comprises reacting sulphur dioxide bearing gases containing an amount of water vapor substantially in excess of that necessary to form sulphuric acid with oxygen in the presence of a water-insensitive catalyst at a temperature of about 350° C. to about 450° C. to cause the conversion of said sulphur dioxide to sulphur trioxide and condensing said gases to form sulphuric acid by subjecting said gases to restricted cooling in the presence of an excess of water vapor between the dew point of the gas mixture and a temperature below 140° C.

CONWAY BARON von GIRSEWALD.
WOLFHART SIECKE.
MAX WOHLWILL.